Figure 1A:
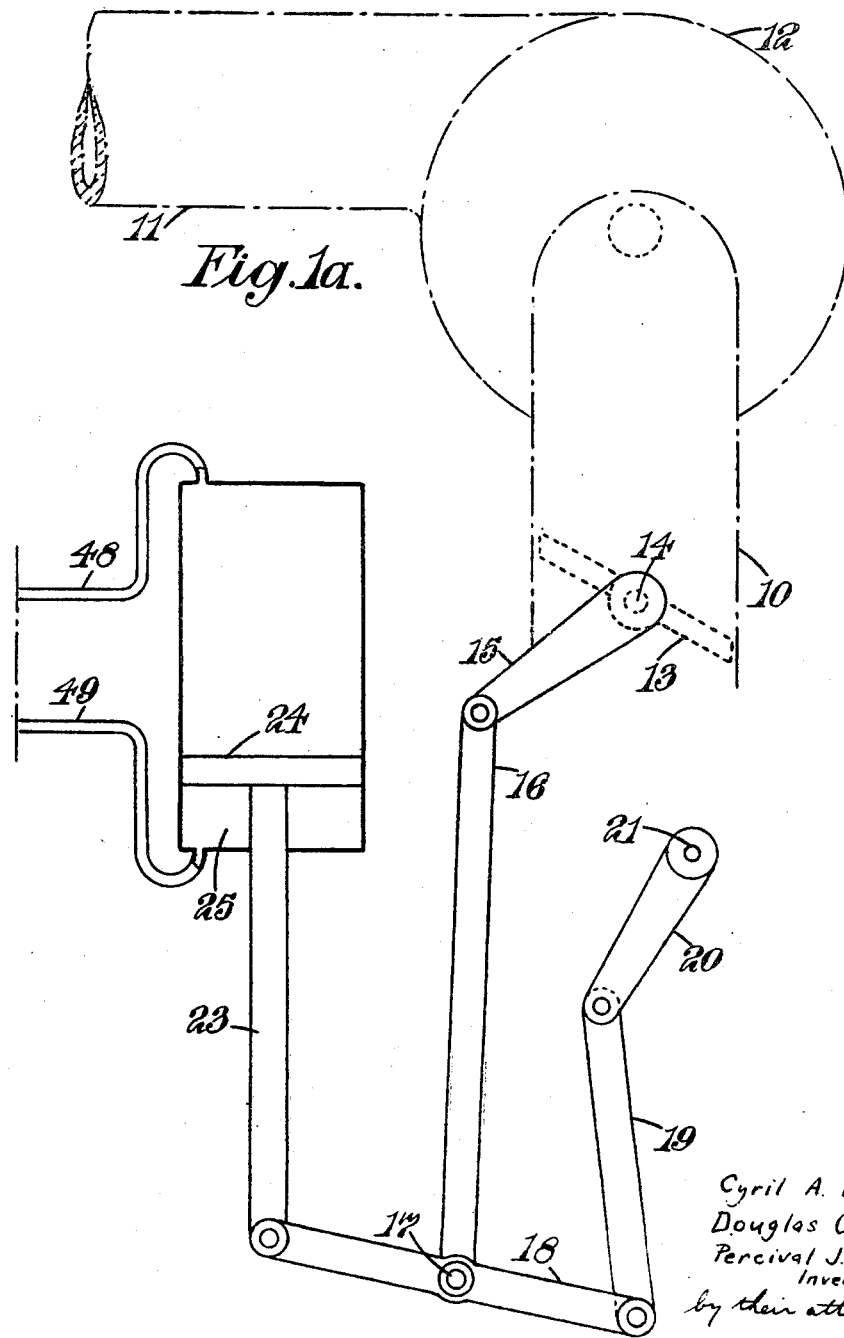

Aug. 28, 1945.   C. A. PUGH ET AL   2,383,563
FUEL CONTROL DEVICE FOR INTERNAL-COMBUSTION ENGINES
Filed Aug. 10, 1943   5 Sheets-Sheet 2

Cyril A. Pugh,
Douglas C. Booth, &
Percival J. Jarvis
Inventors
by their attorneys
Stebbins, Blenko & Webb

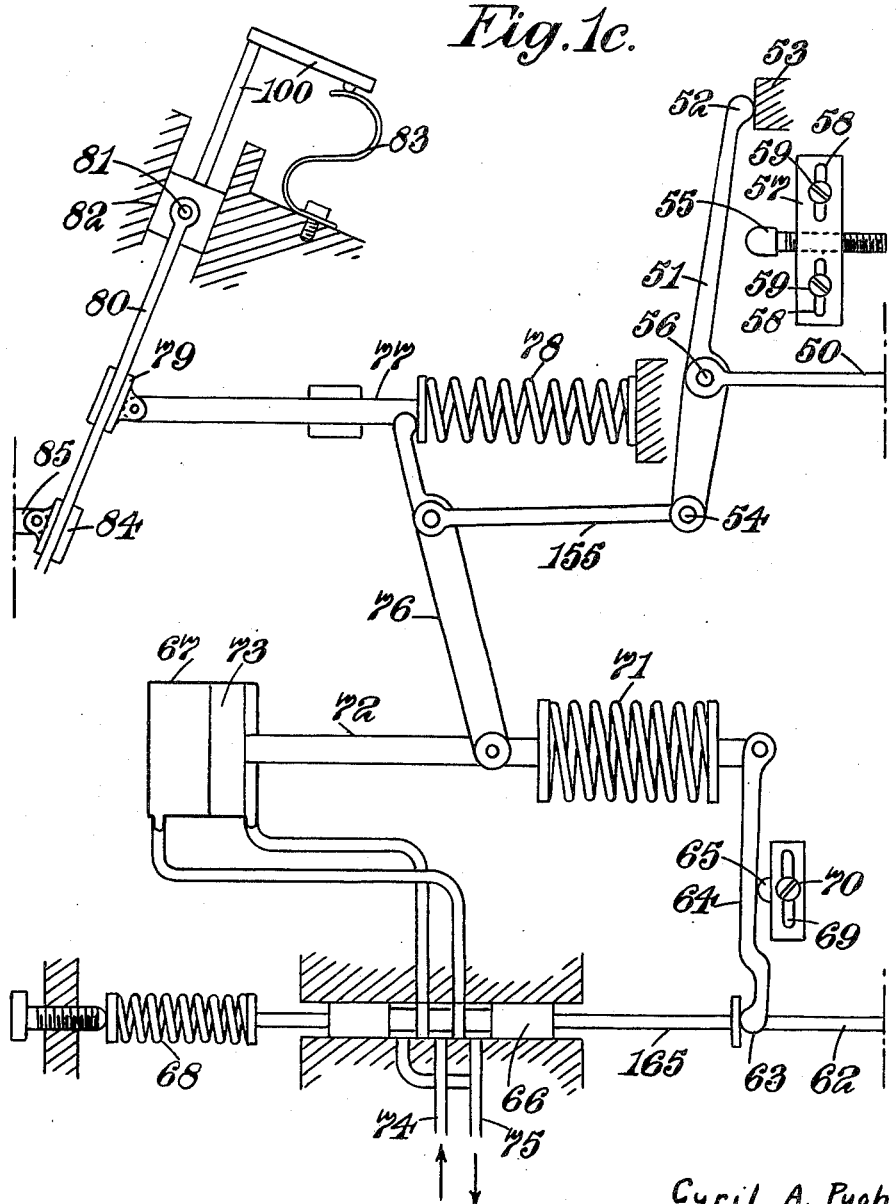

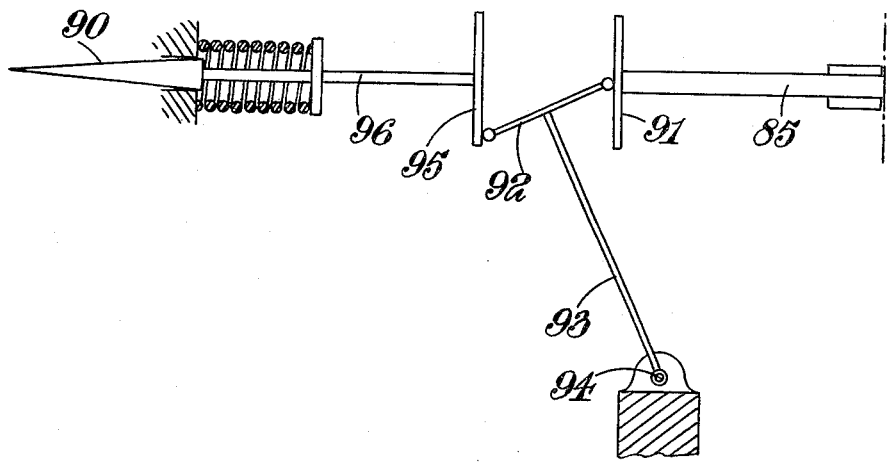

Patented Aug. 28, 1945

2,383,563

UNITED STATES PATENT OFFICE 2,383,563

FUEL CONTROL DEVICE FOR INTERNAL-COMBUSTION ENGINES

Cyril Alphonso Pugh and Douglas Gerhard Booth, Ilford, and Percival John Jarvis, East Ham, London, England, assignors to The Plessey Company Limited, Ilford, England, a British company Application August 10, 1943, Serial No. 498,088
In Great Britain August 25, 1942

10 Claims. (Cl. 123—119)

This invention consists in improvements in or relating to a system for regulating the supply of air and fuel to an internal-combustion engine and in particular to such engines when used on aircraft. The intention of the invention is to regulate the supply of air and fuel in such a manner that the air pressure in the intake manifold of the engine (hereinafter referred to as the boost pressure) can be preset to any desired value, conveniently by manual control, and for any such setting of this control will be maintained constant or substantially constant irrespective of changes in atmospheric pressure so far as lies within the capacity of the blower; and, moreover, in such manner that for any given engine speed, flow of fuel to the engine will be a predetermined function of the boost pressure and preferably also of the engine exhaust back pressure and the temperature in the intake manifold.

Fuel regulating systems in which the boost pressure has been maintained constant or substantially constant and in which the flow of fuel is made a function of the boost and engine exhaust back pressures are known as comprising in combination a conduit in which changes of fluid pressure occur, a pressure sensitive element subjected to such pressure changes and having a part movable in accordance therewith, a pilot valve which serves to control supply of driving fluid to a servo-motor and which is coupled to the movable part of the said pressure sensitive element, a servo-motor, and means operated by the latter to restore the movable part of the pressure sensitive element to its initial position after disturbance of that position has occurred by a change in pressure. The restoration of the original position will, in the case of the boost pressure, occur when the pressure has been brought back to its preset value by the action of the servo-motor operating a throttle valve in the engine air intake manifold.

In a hitherto known example of a fuel regulating system of this kind, a pressure sensitive spring capsule or spring-loaded capsule, having a known spring rate and effective area, has been located in a chamber, the interior of which is subjected to the boost pressure and to fluctuations therein, and a movable wall of the capsule has been directly connected to a pilot valve of a servo-motor which is coupled to and actuates a throttle valve in the intake manifold of the engine. Thus, assuming fluctuations to occur in the boost pressure for any reason whatsoever the capsule will either expand or contract from its preset condition according to the nature of the pressure change and in consequence the servo-motor will be energised to move the throttle either to open or close the latter more or less in order to restore the boost pressure and the pressure surrounding the capsule to its previous value. When this has occurred, the movable wall of the capsule will have resumed its initial position and supply of actuating fluid to the servo-motor will have been cut off by the movement imparted to the pilot valve by the capsule. For instance, one end wall of the capsule may be connected directly to the spindle of a pilot valve, while the other end wall remains relatively fixed. The relatively fixed end or wall can also be acted upon by a cam in order to move the capsule bodily in accordance with the setting of the manual control lever by which a preset value of the boost pressure is determined. In consequence the position of the throttle valve in the intake manifold is also determined according to the existing atmospheric pressure and any variation in the boost pressure from its preset value is immediately checked and the pressure restored in the manner just described.

According to one feature of the present invention, a fuel regulating system of the above general type comprises the employment of a spring of known rate applying pressure directly to the pilot valve in combination with a pressure sensitive element which, as before, is subjected to variations of boost pressure but has its movable part coupled to the pilot valve through a lever or other linkage in such manner that the pressure exerted by the pressure sensitive element due to the action of the boost pressure on it, is balanced by the spring. Any variation of the boost pressure will disturb this balance and so alter the position of the pilot valve. By suitable arrangement of the linkage the movement of the pressure sensitive element can be made small relative to the movement of the spring or pilot valve.

The pressure sensitive element thus still serves as the means for restoring the pilot valve to its neutral or closed position when the boost pressure has been restored to the preset value, but whereas in the previously known fuel regulating systems it was necessary to provide a rated spring capsule capable of considerable and frequent variation in its length without being easily or unduly fatigued, the accurate manufacture of which involves much difficulty, the present invention utilises a rated spring which is relatively simple to manufacture within comparatively fine limits of accuracy. In consequence, the pressure sensitive element may be of a simple form, for example it may be constructed as a capsule, diaphragm or piston, possessing little or no resilience in itself as the movement may be made very small.

The spring which applies pressure to the pilot valve is combined with an actuating member for varying the spring pressure, a throttle control lever or its equivalent operating the spring actuating member and an operative connection between the latter and a fuel control valve whereby any change made in the spring pressure will effect movement of the fuel control valve.

The invention also includes the above fuel regulating system in combination with a pressure sensitive element subjected to variation in exhaust back pressure and the movable part of that element is operatively connected by a system of linkage and a servo-motor to a part of the above-mentioned operative connection between the spring-actuating member and the fuel control valve in such manner that the movement of this second-mentioned pressure sensitive element is applied indirectly to the same fuel control valve to modify its position irrespective of movement imparted to it from the apparatus above described.

For example, the second-named pressure sensitive element may be connected directly or indirectly to a pilot valve of a servo-motor, the piston of which is controlled as to its movements by means of a rated spring balanced against the pressure sensitive element and is coupled by the linkage aforesaid to increase or decrease the adjustment already imparted to the fuel control valve.

The invention further includes the combination of the fuel valve controls subjected to boost pressure and exhaust back pressure as above described and in addition a temperature responsive device which is subjected to changes of temperature at the air intake manifold or other part of the engine and which has a movable part also operatively connected to the same fuel control valve through a linkage by means of which the actuation of the control valve can again be modified to compensate for changes in temperature.

The invention also includes an arrangement whereby when the throttle valve in the air intake to the engine is fully open with the piston of the servo-motor at the end of its stroke and the atmospheric pressure falls so low that the blower cannot maintain the preset boost pressure, a further servo-motor operates to close the fuel valve and reduce the fuel flow to suit a new lower boost pressure.

The invention also includes an arrangement of connections or linkages between the various parts such that no inaccuracies are introduced in the operation of the device by reason of back-lash, all or substantially all the connections from one section of the apparatus to another being loaded through the medium of springs.

The invention further comprises a linkage designed so that the area of opening of a needle valve may be made very nearly proportional to the displacement of an actuating rod, while the needle is made with a uniform taper.

It will be appreciated that by the present invention full control of the fuel is obtained by the use of a single valve of simple type, such as a conical valve having straight sides and co-operating with a fuel orifice, and consequently avoids all complicated and intricate forms of co-operating slide valves with specially shaped co-operating valve ports which have generally been necessary hitherto in fuel regulating systems in which the fuel flow has been controlled in accordance with the combined effects of changes in the preset boost pressure and in exhaust back pressure and temperature. It also enables full control of the fuel system to be obtained by the use of a single operating lever.

In order that the invention may be more clearly understood, one preferred example will now be described with reference to the accompanying diagrammatic drawings Figure 1 of which is drawn in four sections designated by the letters $a$, $b$, $c$, $d$, which carry on from one another from right to left.

Figure 1B:
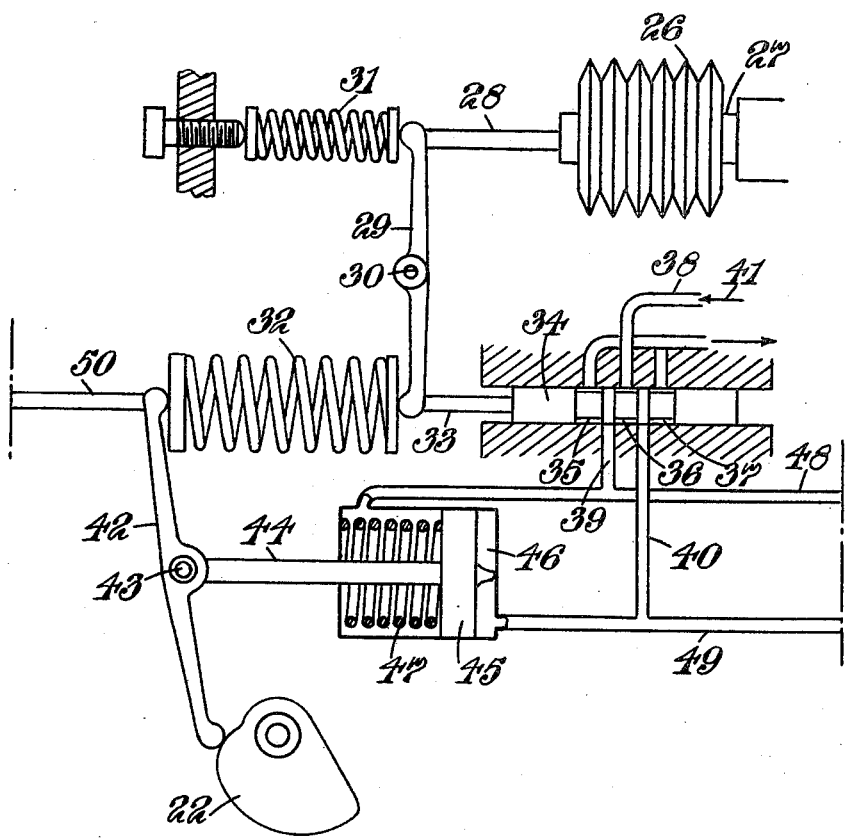
Figure 1B:
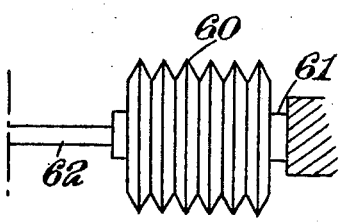
Figure 2:
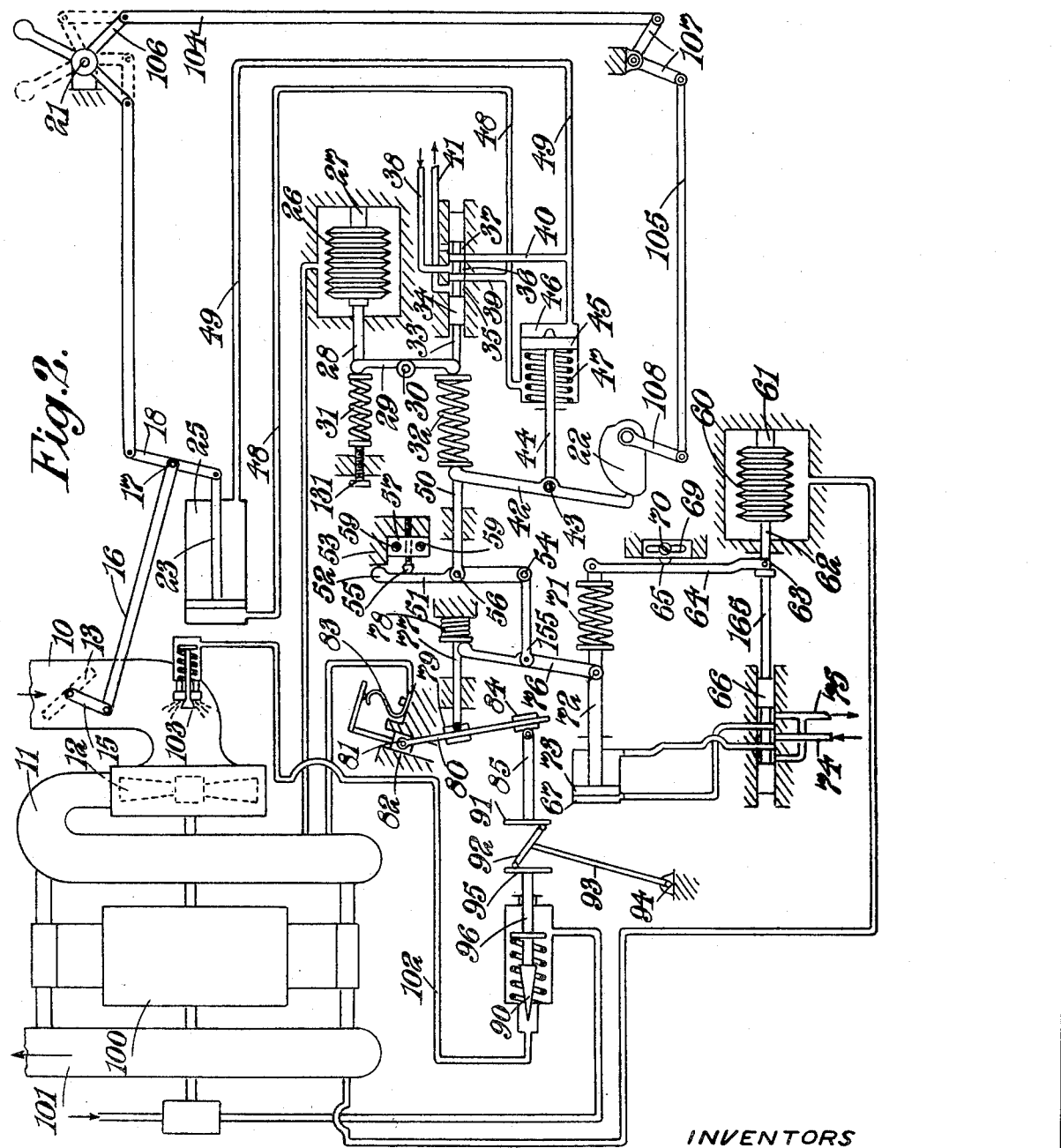

In the drawings,

Figure 1 illustrates the apparatus in condition for minimum idling speed of the engine; and Figure 2 is a schematic composite illustration of a complete apparatus.

In Figure 1 the apparatus is shown in the equilibrium position for the given set of conditions. Moreover, it is to be understood that the drawings are purely diagrammatic and are in no sense to be considered as representing either the relative dimensions or the actual arrangements of the parts in practice.

This particular form of the invention is designed to secure that at constant engine speed the fuel flow to the engine is strictly proportional to $$(aP_b + b - cP_e)(1 - dT)$$

where $P_b$ = absolute boost pressure
$P_e$ = absolute exhaust back pressure
$T$ = inlet manifold temperature, and
$c$ and $d$ are constants, and
$b = b_1$ and $a = a_1$ when $P_b$ is less than a certain transition pressure $P_{bo}$; $b_1$ is normally zero, and
$b = b_2$ and $a = a_2$ and $P_b$ is greater than this transition pressure $P_{bo}$, and
$a_1$, $a_2$, $b_1$ and $b_2$ are constants, subject to the condition that $$a_1 P_{bo} + b_1 = a_2 P_{bo} + b_2$$

The above shows that the variation of fuel flow with boost pressure is linear, but at a certain value of the boost, the rate of variation of flow with boost pressure increases to a new level.

The inlet to the engine manifold is indicated at 10, the manifold itself, indicated at 11, being supplied with air by means of a centrifugal blower 12. A throttle valve 13 is mounted on a spindle 14 to which is secured a throttle lever 15, and the outer end of the latter is connected to one end of a link 16. The other end of this link is connected at 17 to floating lever 18 at or about the middle of the latter. To one end of the floating lever 18 is connected a further link 19 coupling the lever 18 to a manual throttle control lever 20 rotating with a spindle 21, and rotating with this spindle is a throttle cam 22 which, although it is shown widely displaced in the drawings from the spindle 21, is to be understood, in practice, to be mounted on that spindle or on a spindle geared thereto. The other end of lever 18 is pivotally connected to the piston rod 23 of piston 24 of a servo-motor, the cylinder of which is shown at 25.

Boost pressure is registered by an exhausted capsule 26. The end 27 of the capsule is rigidly fixed while the opposite end is connected to one end of a rod 28. A lever 29 is pivoted at 30 substantially midway in its length. The junction between the rod 28 and lever 29 bears against one end of a compression spring 31 by which a datum condition of capsule 26 may be adjusted with the aid of adjusting screw 131. The other end of lever 29 bears upon one end of a second compression spring 32 and is also connected to a piston rod 33 of a pilot valve 34 for the servo-motor 25. The pilot valve is formed with annular recesses 35, 36 and 37 which by movement of the valve will place a fluid pressure inlet passage 38 into communication with one or the other of pipes 39 and 40 leading respectively to opposite ends of the servo-motor 25 and simultaneously will place the other one of those two pipes into communication with a pressure outlet passage 41 leading back to the low pressure side of the source of fluid pressure by which the servo-motor is actuated.

The end of spring 32 remote from its attachment to the lever 29 bears against one end of another lever 42 pivoted at 43 at or about its mid length and bearing at its other end against the manually operated cam 22. The pivot point of lever 42 is actuated by means of a rod 44 attached to a piston 45 sliding in a chamber 46. The piston is loaded by a spring 47 so as to maintain the fulcrum point 43 of the lever 42 in a preset datum position until the overriding or resetting servo-motor operates as described later. The two parts into which chamber 46 is divided by piston 45 are connected respectively to pipes 48 and 49 leading to the opposite ends of the servo-motor 25, these pipes also being connected with pipes 39 and 40 respectively.

In operation of that portion of the device so far described, counterclockwise movement of the manual throttle lever 20 will serve initially to open throttle 13 and at the same time will turn cam 22 thereby rotating lever 42 about its pivot 43 to bear with increased pressure against spring 32. The other end of this compression spring will consequently be moved thus moving pilot valve 34 of the servo-motor to cause piston 24 to move in a direction tending to open the throttle further. At the same time the movement of this end of spring 32 will rotate lever 29 so as to expand the boost pressure capsule 26 beyond its normal length. Movement of piston 24 will, however, continue until the throttle 13 has opened so far that the increased boost pressure which results is sufficient to return capsule 26 to its normal length and thereby through lever 29 return the pilot valve of the servo-motor to its normal or closed position.

It is assumed that during the above operation, movement of valve 34 has placed passage 38 into communication with pipe 40 until a condition of equilibrium has been established whereupon, by the action of capsule 26, valve 34 will have been returned to its neutral position. The various parts of the apparatus will then be in equilibrium, assuming that the throttle opening is only required to provide cruising boost.

The throttle can be further opened, for example to the maximum boost position, by further manipulation of the manual throttle control 21 and a similar actuation will occur until the equilibrium condition, corresponding thereto, has been established.

If the setting of the manual control remains unaltered and atmospheric pressure is reduced, this will decrease the boost pressure and will permit capsule 26 to expand, thereby opening pilot valve 34 of the servo-motor once more. Throttle 13 will therefore be opened still further until the boost pressure returns to its preset value, governed by the position of cam 22, when capsule 26 will again close pilot valve 34.

Should the atmospheric pressure fall so low, especially when the full throttle height for the preset boost is reached, that the blower 12 is unable to maintain the set boost pressure even with the piston at the end of its stroke and therefore the throttle fully open, the pilot valve will remain open, as the capsule and spring will be out of balance. This will cause the pressure tending to open the throttle to rise, and this pressure, which also communicates with the side of the piston in the resetting servo-motor 46 opposite the spring, will overcome the spring and cause the piston to move, and thereby relieve the pressure on spring 32, thus allowing pilot valve 34 to close and capsule 26 to return to its normal length. In so doing, it will move the rod 50 in a direction tending to close the fuel control valve 90.

When, e. g., at a lower altitude, the atmospheric pressure is such that the blower is again able to maintain the preset boost pressure, the resetting servo-piston 46 returns towards its former position. This is caused by admission of hydraulic fluid to pipe 39 through which fluid is delivered not only to the left-hand side of piston 45 but also to pipe 48, and thence to the upper end of cylinder 25. Piston 45, however, moves before piston 24 because, although the hydraulic pressure in both cylinders is the same, piston 45 is assisted by pressure of spring 47.

Under all the above circumstances when the device has reached a stable position, a rod 50 connected to the end of spring 32 will have reached a position dependent upon the boost pressure.

Turning now to the other parts of the apparatus illustrated, it will be seen that rod 50 is connected to a lever 51 normally pivoted about one end 52 by that end bearing against a fixed fulcrum 53. The other end of the lever 51 is pivotally connected at 54 to a rod 155, the movement of which will thus be normally a constant multiple of the movement of rod 50. After the lever 51 has rotated about its fulcrum, in an anticlockwise direction to a certain degree, it will engage another fulcrum 55 between the end 52 and the pivotal connection 56 of the rod 50 with lever 51. The point at which the lever 51 contacts fulcrum 55 is the point at which $P_{bo}$, i. e., the transitional pressure, exists. Fulcrum 55 is made adjustable so that it can be moved parallel to rod 50 by screwthreading it into a bracket 57 and also perpendicular to the rod 50 by adjustment of bracket 57 with the aid of slots 58 in the bracket engaged by fixing screws 59. Thus, when rod 50 has moved beyond a predetermined extent the fulcrum shifts from 53 to 55 thereby causing a greater relative movement of the end 54 thereby modifying the law governing the alteration of boost pressure. It will be therefore clear that since the position of rod 50 is dependent upon the boost pressure the position of rod 155 can for values of $P_b$ less than $P_{bo}$ (before lever 51 contacts the fulcrum point 55) be made proportional to $a_1 P_b + b_1$. When the lever 51 contacts 55 the law becomes $a_2 P_b + b_2$, the values of $a_1$ and $b_1$ being determined by suitable choice of the sizes of the various parts, the rate of spring 32, load imposed by the spring 31 and the area of the capsule, etc., $a_2$ and $b_2$ are set by adjusting the position of the fulcrum point 55.

The exhaust back pressure is registered on another exhausted capsule 60, one end 61 of which is rigidly fixed while the other end is connected to a rod 62. This rod at its other end is pivotally connected at 63 to one end of a lever 64 and also bears on the end of another rod 155 which is connected to the pilot valve 66 of a servo-motor 67. The datum position of the valve 66 is controlled by spring 68 corresponding in its action to spring 31 already referred to, although in this case the pilot valve is in coaxial alignment with and between the spring and the capsule. Lever 64 is pivoted approximately about its middle on a fulcrum 65 which can be adjusted perpendicular to the rod 62 by mounting the fulcrum 65 on a bracket formed with a slot 69 through which passes a fixing screw 70. At its other end, lever 64 bears against a compression spring 71 which at its further end is connected to a rod 72 comprising the piston rod for a piston 73 of the servo-motor 67. The motion of rod 72 is proportional to the exhaust back pressure since this part of the device acts in a manner substantially identical with that already described in connection with the boost pressure responsive part of the apparatus, the length of the exhaust back pressure capsule being maintained substantially constant, while changes in pressure are taken up by the compression spring 71. The flow of pressure fluid to the pilot valve 66 through the inlet and return pipes 74 and 75 is indicated by arrows as is also the case in connection with the pilot valve 34.

There are thus two rods, namely, 155 and 72, the motion of the first being proportional to $aP_b+b$ and that of the second proportional to $cP_e$. This latter constant $c$ may be adjusted to the required value by movement of the adjustable stop 65. The motion of the two rods 72 and 155 is combined by connecting both to another lever 76, one at one end thereof and the other at a point between the two ends as shown, while the other end of lever 76 is connected to another rod 77. It will be clear, therefore, that by a suitable choice of lengths of levers and of the rates of the springs 32 and 71 and the adjustments of the fulcrums 55 and 65 the position of this rod relative to a datum point may be made proportional to $aP_b+b-cP_e$, and the required values of $a_1$ $b_1$ and $c$ obtained, and the rod works against the compression spring 78 so as to avoid any back-lash.

In order to compensate for the temperature factor, rod 77 is connected by means of a sliding connection 79 to another rod 80, which latter is pivoted on a block 81 which can slide in guides 82 inclined somewhat relatively to rod 77. The position of block 81 is controlled by an element 83 responsive to temperature in the intake to the engine, for example the manifold 11, and may be constituted by a Bourdon tube or a bi-metallic strip operatively connected with rod 80 by means of bracket 100 fixed to slide with block 81. The parallel guides 82 may be replaced if desired by a curved guide, the curvature of which corresponds to any desired law.

The other end of the lever 80 has a sliding connection at 84 with another rod 85. It will be clear that the arrangement of parts 79 to 85 provides a variable ratio multiplying device by means of which the temperature correction factor can be introduced. The correct value of the constants can be decided by a suitable disposition of the above-mentioned parts and, if necessary, by the addition of a further multiplying lever actuated by rod 85. The motion of rod 85 can therefore be made proportional to $$(aP_b+b-cP_e)(1-dT)$$

and the temperature correction adjustment arranged so that no movement of the rod 85 takes place for any variation of temperature when $$aP_b+b-cP_e=0$$

The rod 85 may be connected in any preferred manner directly to the controlling needle valve 90 which controls the supply of fuel. Preferably, the connection consists in terminating rod 85 in a plate 91 against which bears a T-shaped lever 92, 93 pivoted at 94. The other end of the part 92 of this T-shaped lever bears against a plate 95 connected to a rod 96 on which the needle valve 90 is mounted. By a suitable choice of the dimensions of the T-shaped lever 92, 93, needle valve 90 may be formed with a uniform taper as diagrammatically illustrated and its area of opening will approximate very closely to a linear function of the motion of rod 85. Thus, the area of opening of the conical needle valve may be made proportional to $$(aP_b+b-cP_2)(1-dT)$$

and provided that the fuel system is so arranged that the pressure drop across the needle valve is constant for constant engine speed, the required relationship between the boost pressure, exhaust back pressure, inlet engine air temperature and fuel flow, is obtained.

It will be appreciated that the springs described all operate to nullify back-lash in various moving parts of the apparatus and the connections of one part to another, also that the exhausted capsules such as 26 and 60 will maintain substantially constant length although it will be understood that certain, though very small, changes in length will occur with changes in pressure, but these are sufficient only to move the pilot valves sufficiently far to operate the servo-motors.

Lever 51 which may be considered as an enrichment lever provided as it is with two alternative fulcrums serves to change the law of boost and to provide extra enrichment at high boost as set by cam 22.

It is obvious that the T-shaped lever 92, 93 may be replaced by any other device, such as a geometrical equivalent of that lever, which will produce the same control of movement imparted to a valve such as 90 from an actuating rod such as 85.

In Figure 2 a complete apparatus is illustrated in which generally the same reference numerals are used for denoting the various parts as in Figure 1.

We claim:

1. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve, a linkage coupling the latter to the movable portion of the pressure sensitive element in such manner that the force exerted by the pressure sensitive element due to intake air pressure acting upon it will be balanced by the spring, an adjusting member for varying the pressure of the spring, a throttle control element for operating the spring adjusting member, a fuel regulating valve and an operative connection between the spring adjusting member and the fuel regulating valve whereby any adjustment of the spring adjusting member imparts also adjustment to the fuel regulating valve, a second pressure sensitive element subjected to variation in exhaust back pressure and means operatively connecting a movable part of that element to a portion of the operative connection between the spring adjusting member and the fuel-regulating valve in such manner that an adjustment proportional to the exhaust back pressure is applied to the linkage connecting the intake air-pressure spring adjusting member to the fuel-regulating valve in such manner to modify the position of the fuel-regulating valve as determined by the intake air pressure spring adjusting member.

2. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve, a linkage coupling the latter to the movable portion of the pressure sensitive element in such manner that the force exerted by the pressure sensitive element due to intake air pressure acting upon it will be balanced by the spring, an adjusting member for varying the pressure of the spring, a throttle control element for operating the spring adjusting member, a fuel regulating valve and an operative connection between the spring adjusting member and the fuel regulating valve whereby any adjustment of the spring adjusting member imparts also adjustment to the fuel regulating valve, a second pressure sensitive element subjected to variation in exhaust back pressure and means operatively connecting a movable part of that element to a portion of the operative connection between the spring adjusting member and the fuel-regulating valve in such manner that an adjustment proportional to the exhaust back pressure is applied to the linkage connecting the intake air-pressure spring adjusting member to the fuel-regulating valve in such manner to modify the position of the fuel-regulating valve as determined by the intake air pressure spring adjusting member, the said second pressure sensitive element being combined with a servo motor and connected directly or indirectly to a pilot valve for said servo motor, the piston of the latter being controlled as to its movement by means of its pilot valve cooperating with a rated spring balanced with the pressure sensitive element and coupled to means comprising the aforesaid operative connection to the fuel-regulating valve.

3. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve, a linkage coupling the latter to the movable portion of the pressure sensitive element in such manner that the force exerted by the pressure sensitive element due to intake air pressure acting upon it will be balanced by the spring, an adjusting member for varying the pressure of the spring, a throttle control element for operating the spring adjusting member, a fuel regulating valve and an operative connection between the spring adjusting member and the fuel regulating valve whereby any adjustment of the spring adjusting member imparts also adjustment to the fuel regulating valve, a second pressure sensitive element subjected to variation in exhaust back pressure and means operatively connecting a movable part of that element to a portion of the operative connection between the spring adjusting member and the fuel-regulating valve in such manner that an adjustment proportional to the exhaust back pressure is applied to the linkage connecting the intake air-pressure spring adjusting member to the fuel-regulating valve in such manner to modify the position of the fuel-regulating valve as determined by the intake air pressure spring adjusting member and in addition a temperature-responsive device which is subjected to changes of temperature of the intake air of the engine and which has a movable part also operatively connected to the same fuel-regulating valve through a linkage by means of which the adjustment of the control valve can be further modified by changes in temperature.

4. A fuel-regulating system for internal-combustion engines comprising in combination a conduit in which changes of intake air pressure occur, a pressure sensitive-element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve and a linkage coupling the latter to the movable portion of the pressure sensitive element in such manner that the force exerted by the pressure sensitive element due to intake air pressure acting upon it will be balanced by the spring, the pressure sensitive element being restored to its initial on normal position irrespective of the pressure at which the system is adjusted to control, and subject to pressure obtaining within the engine manifold, and the means for restoring the inlet air pressure comprising a throttle valve which controls passage to the manifold and is operatively connected to a servo motor in such manner that the latter will actuate the throttle to increase or decrease pressure in the manifold on an increase or decrease respectively in the length of the pressure sensitive element thereby serving to restore the pressure sensitive element to its initial or normal position and in addition a fuel-regulating valve comprising means coupling said valve to the throttle valve, such that the fuel-regulating valve will be opened or will tend to open as the throttle valve is opened.

5. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve and a linkage coupling the latter to the movable portion of the pressure sensitive element in such manner that the force exerted by the pressure sensitive element due to intake air pressure acting upon it will be balanced by the spring, two pressure sensitive devices, one of which is subjected to pressure obtaining in the engine air intake and the other is subjected to engine exhaust back pressure, a fuel-regulating valve comprising an actuating member, and means coupling the latter with both pressure sensitive elements in such manner that the said actuating member will be moved or will tend to be moved in opposite directions by changes of pressure on the pressure sensitive elements in a similar sense.

6. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve and a linkage coupling the latter to the movable portion of the pressure sensitive element in such manner that the force exerted by the pressure sensitive element due to intake air pressure acting upon it will be balanced by the spring, two pressure sensitive devices, one of which is subjected to pressure obtaining in the engine air intake and the other is subjected to engine exhaust back pressure, a fuel-regulating valve comprising an actuating member, and means coupling the latter with both pressure sensitive elements in such manner that the said actuating member will be moved or will tend to be moved in opposite directions by changes of pressure on the pressure sensitive elements in a similar sense, and in addition a fuel-regulating valve comprising an actuating member, and an operative connection between the said actuating member and both said pressure sensitive elements, the said operative connection comprising a system of linkages including springs through which motion is transmitted between one linkage and another, thereby obviating backlash.

7. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve, a linkage coupling the latter to the movable portion of the pressure sensitive element in such manner that the force exerted by the pressure sensitive element due to intake air pressure acting upon it will be balanced by the spring, an adjusting member for varying the pressure of the spring, a throttle control element for operating the spring adjusting member, a fuel regulating valve and an operative connection between the spring adjusting member and the fuel regulating valve whereby any adjustment of the spring adjusting member imparts also adjustment to the fuel regulating valve, a second pressure sensitive element subjected to variation in exhaust back pressure and means operatively connecting a movable part of that element to a portion of the operative connection between the spring adjusting member and the fuel-regulating valve in such manner that an adjustment proportional to the exhaust back pressure is applied to the linkage connecting the intake air-pressure spring adjusting member to the fuel-regulating valve in such manner to modify the position of the fuel-regulating valve as determined by the intake air pressure spring adjusting member and in addition a temperature responsive device which is subjected to changes of temperature of the intake air of the engine and which has a movable part also operatively connected to the same fuel-regulating valve through a linkage by means of which the adjustment of the control valve can be further modified by changes in temperature, and a temperature sensitive device comprising part of the operative connection between the fuel-regulating valve and the pressure sensitive element, the said temperature sensitive device serving to modify, in accordance with changes in temperature to which the device is exposed, movement imparted to the actuating member.

8. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve and a linkage coupling the latter to the movable portion of the pressure sensitive element in such manner that the force exerted by the pressure sensitive element due to intake air pressure acting upon it will be balanced by the spring, two pressure sensitive devices, one of which is subjected to pressure obtaining in the engine air intake and the other is subjected to engine exhaust back pressure, a fuel-regulating valve comprising an actuating member, and means coupling the latter with both pressure sensitive elements in such manner that the said actuating member will be moved or will tend to be moved in opposite directions by changes of pressure on the pressure sensitive elements in a similar sense, and in addition a temperature sensitive device comprising part of the operative connection between the fuel-regulating valve and both pressure sensitive elements, the said temperature sensitive device serving to modify, in accordance with changes in temperature to which the device is exposed, movement imparted to the actuating member.

9. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by a change in pressure, a spring of known rate applying pressure directly to the pilot valve, a linkage coupling the latter to the movable portion of the pressure sensitive element in such manner that the force exerted by the pressure sensitive element due to intake air pressure acting upon it will be balanced by the spring, an adjusting member for varying the pressure of the spring, a throttle control element for operating the spring adjusting member, a fuel regulating valve and an operative connection between the spring adjusting member and the fuel regulating valve whereby any adjustment of the spring adjusting member imparts also adjustment to the fuel regulating valve, a second pressure sensitive element subjected to variation in exhaust back pressure and means operatively connecting a movable part of that element to a portion of the operative connection between the spring adjusting member and the fuel-regulating valve in such manner that an adjustment proportional to the exhaust back pressure is applied to the linkage connecting the intake air pressure spring adjusting member to the fuel-regulating valve in such manner to modify the position of the fuel-regulating valve as determined by the intake air pressure spring adjusting member and in addition a temperature responsive device which is subjected to changes of temperature of the intake air of the engine and which has a movable part also operatively connected to the same fuel-regulating valve through a linkage by means of which the adjustment of the control valve can be further modified by changes in temperature, and a temperature sensitive device comprising part of the operative connection between the fuel-regulating valve and the pressure sensitive element, the said temperature sensitive device serving to modify, in accordance with changes in temperature to which the device is exposed, movement imparted to the actuating member, in which the part of the operative connection including the temperature sensitive device comprises a lever, the mechanical advantage or leverage of which is changed in accordance with changes of temperature by the action of the temperature sensitive device.

10. A fuel-regulating system for internal-combustion engines comprising in combination a conduit in which changes of intake air pressure occur, a pressure sensitive element subjected to such pressure changes and having a part movable in accordance therewith, a servo motor, a pilot valve which serves to control the supply of driving fluid to the servo motor and which is coupled to the movable part of said pressure sensitive element, means operated by the servo motor to restore the inlet air pressure so that the movable part of the pressure sensitive element is restored thereby to its initial position after disturbance of that position has occurred by change in pressure, a spring of known rate applying pressure directly to the pilot valve and a linkage coupling the latter to the movable portion of the pressure sensitive element in such manner that the force exerted by the pressure sensitive element due to intake air pressure acting upon it will be balanced by the spring, two pressure sensitive devices, one of which is subjected to pressure obtaining in the engine air intake and the other is subjected to engine exhaust back pressure, a fuel-regulating valve comprising an actuating member, and means coupling the latter with both pressure sensitive elements in such manner that the said actuating member will be moved or will tend to be moved in opposite directions by changes of pressure on the pressure sensitive elements in a similar sense, and in addition a temperature sensitive device comprising part of the operative connection between the fuel-regulating valve and both pressure sensitive elements, the said temperature sensitive device serving to modify, in accordance with changes in temperature to which the device is exposed, movement imparted to the actuating member, in which the part of the operative connection including the temperature sensitive device comprises a lever, the mechanical advantage or leverage of which is changed in accordance with changes of temperature by the action of the temperature sensitive device.

CYRIL ALPHONSO PUGH.
DOUGLAS GERHARD BOOTH.
PERCIVAL JOHN JARVIS.